United States Patent [19] [11] 3,848,236
Troutman [45] Nov. 12, 1974

[54] THRESHOLD CIRCUIT

[75] Inventor: Bruce L. Troutman, Buena Park, Calif.

[73] Assignee: Rockwell International Corporation, El Segundo, Calif.

[22] Filed: May 11, 1973

[21] Appl. No.: 359,573

[52] U.S. Cl. ........................ 340/173 R, 340/173 CA
[51] Int. Cl. ............................................. G11c 7/00
[58] Field of Search.... 340/173 SP, 173 CA, 173 R; 320/1

[56] References Cited

UNITED STATES PATENTS 3,765,002 10/1973 Basse ........................... 340/173 CA

*Primary Examiner*—Stuart N. Hecker
*Attorney, Agent, or Firm*—L. Lee Humphries; H. Fredrick Hamann; G. Donald Weber, Jr.

[57] ABSTRACT

A threshold circuit for reducing the time required to discharge an input voltage at a data node from a first to a second logic level. The circuit includes a controllable shunt field effect transistor connected to provide a secondary discharge path between the data node and a voltage reference of the second logic level. As the input voltage begins to discharge along a primary discharge path, the resulting change in the input voltage level is fed back to the control electrode of the shunt transistor to turn on the shunt transistor and connect the data node to the voltage reference along the secondary discharge path to more quickly discharge the input voltage to the second logic level. In the preferred embodiment, the threshold circuit is connected to the output node of a read-only memory to reduce the read-out time of logic information stored in the memory.

2 Claims, 2 Drawing Figures

THRESHOLD CIRCUIT

BACKGROUND OF THE INVENTION

1. Field of the Invention

This invention relates to semiconductor logic circuits and, more particularly, to a circuit for rapidly switching a voltage level from a first to a second logic state.

2. Description of the Prior Art

In certain semiconductor logic circuits, such as those employing field effect transistors controlled by multiple phase clock signals, it is common practice to initially precharge a circuit node to a first voltage level representing a first logic state and to subsequently conditionally discharge the node. As a result of the conditional discharge, the node will either remain at the first voltage level or will be discharged to a second voltage level representing a second logic state. The resulting voltage level established at the node is then available for use as a logic input to succeeding logic or drive circuitry.

In general, the above charging and discharging operations are preformed within operating time intervals established by the multiple phase clock signals. Typically, for example, operating intervals on the order of only several microseconds will be available, and successful circuit operation requires minimal time delay in effecting the voltage discharge between logic states.

Various forms of semiconductor memories exist which employ the overall precharge-conditional discharge operation described above in order to read out logic information stored in the memory. U.S. Pat. No. 3,728,696 discloses a read-only memory having a plurality of columns formed in a semiconductor substrate. Information is stored at address locations between adjacent columns by address field effect transistors connecting adjacent columns wherein the presence of an address field effect transistor represents storage of one logic state of information and the absence of such a transistor represents storage of information of another logic state. In operation, the memory columns are initially precharged to a first voltage level representing a first logic state (e.g., true), and, thereafter, read out of stored information is accomplished by conditionally discharging the pair of columns associated with a selected addressed location. One column of the pair is connected to an output data node and the second column of the pair is connected to a reference voltage source representing a second logic state (e.g., false). During read out, if no address field effect transistor is connected between the pair of columns at the addressed location, the columns remain isolated from each other so that the columns remain charged and the first voltage level (true) is connected to the output node. However, if an address field effect transistor is present at the addressed location, it provides a conductive discharge path between the columns, and both columns are discharged to the reference voltage source to connect the reference voltage level (false) to the output node.

Unfortunately, the time required to discharge the selected columns of the read-only memory increases as the size and storage capacity of the memory increases. This is due at least in part to the parasitic capacitive coupling between selected and unselected columns of the memory and to certain configurations of the address field effect transistors which may require the discharge together not only of the selected pair of columns but of additional unselected columns as well. As a result, a trade-off results between the operating speed and the storage capacity of the readonly memory, which restricts relatively high speed logic circuits to the use of relatively small capacity memories.

SUMMARY OF THE INVENTION

Briefly, and in general terms, the present invention resides in a novel threshold circuit connected to a data node at which a logic voltage level may be conditionally switched from a first to a second logic state, the threshold circuit providing a controllable shunt path between the data node and a source of reference voltage corresponding to the second logic state. Means is provided responsive to the changing voltage level at the data node, as the voltage level is in transition from the first to the second state, to render the shunt path conductive to speed up the voltage transition. In this manner, switching time is significantly reduced and the logic information thus derived may be immediately directed by the threshold circuit to succeeding circuit elements or stages.

More specifically, in a preferred embodiment of the invention, shown herein for purposes of illustration, the controllable shunt path is provided through a selectively controllable shunt field effect transistor having its conduction path connected between the data node and the source of reference voltage. The voltage level at the data node is connected by means of a feedback arrangement to the control electrode of the shunt field effect transistor to control conduction thereof. The feedback arrangement includes a first field effect transistor having its control electrode connected to the data node and one of its remaining electrodes connected to an output node, with the control electrode of the shunt transistor also being connected to the output node. By this arrangement, the initial voltage transition at the data node toward the second logic state is fed back for rendering the shunt transistor conductive to drive the data node to the second logic state in a rapid manner. A second field effect transistor having is conduction path connected between the output node and a voltage source is employed along with the first field effect transistor to derive an output level at the output node to be supplied to appropriate output circuitry. Overall circuit operation is controlled by clock signals, one of which may provide the source of reference voltage to which the shunt field effect transistor is connected.

In one application, the threshold circuit of the invention receives the logic information read out of a semiconductor memory, such as a read-only memory and, for a given size memory, serves to decrease the retrieval time for information stored in the memory.

Other advantages and objects of the invention will become apparent from the following detailed description taken in conjunction with the accompanying drawings.

DESCRIPTION OF THE PREFERRED EMBODIMENT

Figure 1:
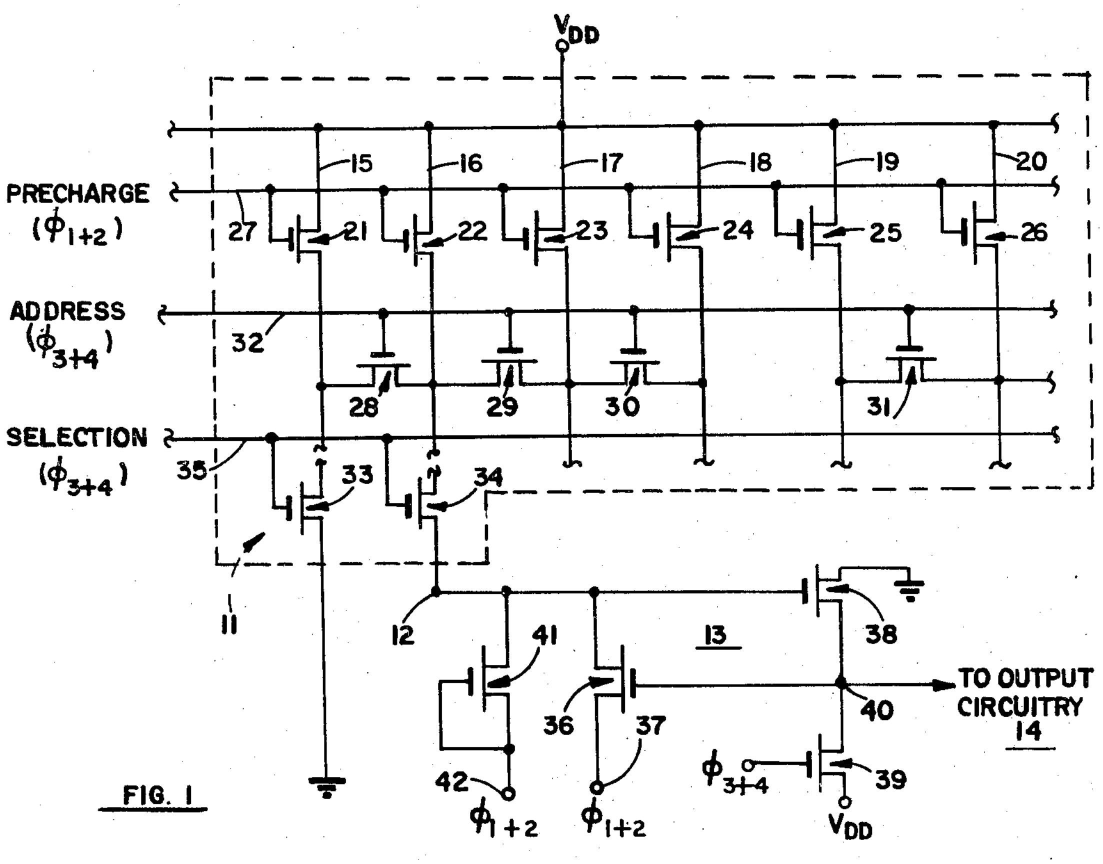
FIG. 1 is an electrical schematic of logic circuitry embodying the novel features of the present invention.

As shown in the drawings for purposes of illustration, and in particular FIG. 1 thereof, the present invention is embodied in a logic system which may be used to rapidly transfer logic information from a semiconductor memory to appropriate output circuitry. In general, the system includes a read-only memory 11 having a data node 12 at which information read out of the memory is received and directed as an input to a threshold circuit 13. The output of the threshold circuit is, in turn, directed to output circuitry 14 such as a driver circuit or further logic stage.

Figure 2:
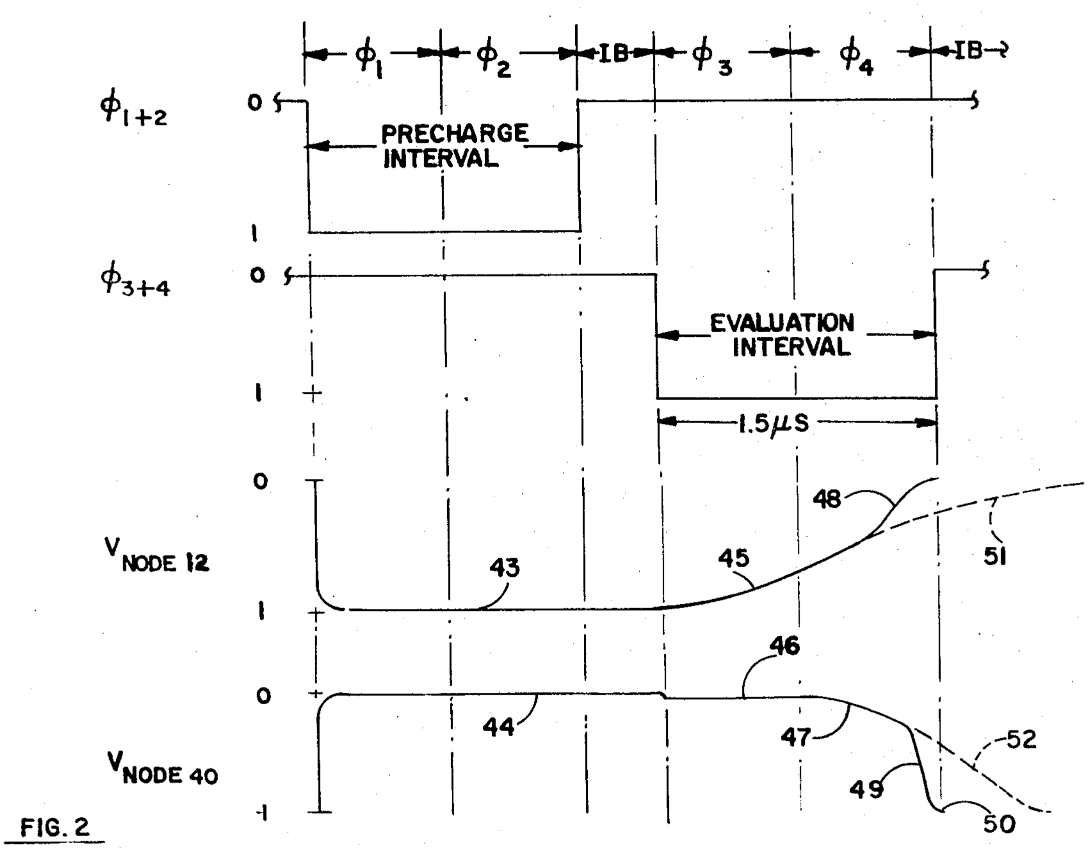
FIG. 2 illustrates, as a function of time, the clock signals for controlling the circuitry of FIG. 1 and the voltage waveforms at selected points of the circuitry.

The operating cycle of the system is controlled by the two clock signals illustrated in FIG. 2, which are conventionally available in prior four-phase logic systems. The $\phi_{1+2}$ clock signal has a logic one or true level during first and second phase time intervals viz. $\phi_1$ and $\phi_2$ and has a zero or false level at all other times. The $\phi_{3+4}$ clock has a logic one or true level during third and fourth phase time intervals viz. $\phi_3$ and $\phi_4$ and a zero or false level otherwise. The true intervals of the two clock signals are separated by in-between time intervals designated IB. For discussion purposes, the true interval of the $\phi_{1+2}$ clock signal will hereinafter be referred to as the first or precharge interval, while the true interval of the $\phi_{3+4}$ clock signal will be referred to as the second or evaluation interval. In addition, the field effect transistors to be discussed subsequently with respect to the preferred embodiment are of the P-channel, enhancement mode, insulated-gate type exhibiting a threshold voltage of approximately 6 volts. For this embodiment, a first reference voltage level, i.e. $V_{DD}$, of approximately −25 volts and a second reference voltage level, i.e. ground, may be employed. The negative level is treated hereinafter as a true level while ground is treated as a false level. The above $\phi_{1+2}$ and $\phi_{3+4}$ clock signals exhibit similar negative (true) and ground (false) levels. It should be understood, however, that other logic conventions could be utilized if desired. Moreover, it will also be apparent to those skilled in the art that N-channel or other forms of transistors or switching devices could be employed in the present system.

Referring again to FIG. 1, the read-only memory 11 is depicted as the type disclosed in the previously mentioned patent, and for this reason, only so much of the memory as is necessary for an understanding of the present invention is illustrated and discussed herein. Briefly, the memory comprises a semiconductor substrate in which a plurality of columns are situated, six of which are illustrated by vertical lines 15, 16, 17, 18, 19, and 20, and which are formed by diffusion or other appropriate techniques. The upper ends of the columns are connected to the source of potential $V_{DD}$. At their lower ends, alternate ones of the columns are connected to a source of reference voltage, illustrated as ground level, and the remaining columns between the alternate ones are connected to data node 12 of the memory. These connections for the lower ends of the columns are illustrated only for the columns 15 and 16. Each column has a corresponding one of precharge field effect transistors 21, 22, 23, 24, 25 and 26 disposed in series therewith, and the control electrode of each precharge transistor is connected to horizontally extending precharge line 27. The precharge line, in turn is connected to receive the $\phi_{1+2}$ clock signal.

Memory address locations are situated between adjacent columns of the read-only memory 11, and address field effect transistors are provided, if at all, at selected address locations to represent information stored at each location. Thus, for the illustrated horizontal row of memory address locations, an address field effect transistor 28 is connected between the pair of adjacent columns 15 and 16, while address field effect transistors 29, 30 and 31, respectively, are connected between corresponding column pairs 16–17, 17–18, and 19–20. Note that no address field effect transistor is formed at the memory address location between column pair 18–19. The control electrode of each address field effect transistor is connected to horizontally extending address line 32, and the address line, in turn, is connected to receive an address signal during the evaluation interval (i.e. during $\phi_{3+4}$).

Still referring to FIG. 1, selection field effect transistors are formed, one each, in series with the columns of the read-only memory for selecting an adjacent pair of columns. Selection field effect transistors are illustrated at 33 and 34 in series with respective columns 15 and 16. These transistors have their control electrodes connected to horizontally extending selection line 35, the selection line being, in turn, connected to receive a selection signal during the evaluation interval (i.e., during $\phi_{3+4}$).

In operation of the read-only memory 11, the precharge transistors 21–26 are turned on during the precharge interval by the $\phi_{1+2}$ clock signal at their control electrodes to precharge the columns 15–20 to a true voltage level. Thereafter, during the evaluation interval, a selected pair of selection field effect transistors 33–34, etc., will be turned on, as will be the address field effect transistors 28–31, by the respective selection and address signals at their control electrodes. In the case of the memory address location defined by address field effect transistor 28, it will be noted that selection field effect transistors 33–34, along with address transistor 28, will be turned on during $\phi_{3+4}$. As a result, a conductive discharge path will be provided to ground level, to thereby connect data node 12 via this conductive path through transistors 34, 38, and 33 to ground, and thus, establish a false logic level at the data node. On the other hand, if address field effect transistor 28 had been omitted, no discharge path would have been provided for column 16 and the output signal at data node 12 would have been a true level. Thus, the column 16 is conditionally discharged depending upon the presence or absence of address field effect transistor 28. That is, if the address transistor 28 is absent, column 16 remains charged to a true level; when the address transistor is present and addressed, column 16 is discharged to a false level.

It will be recalled that the time required to discharge the columns of the read-only memory determines the time required to read information out of the memory. If the discharge rate is too slow, the output level at data node 12 will lie intermediate a true or false level and may be incorrectly interpreted by succeeding circuitry. Connection of address field effect transistors 28–31, as in FIG. 1, may increase the discharge time when columns 15–16 are selected by selection field effect transistors 33 and 34. This is because each of the address transistors 28, 29 and 30 is turned on concurrently and, thus, each of the unselected columns 17 and 18, in addition to the selected columns, is connected to be discharged through appropriate address transistors 30, 29, and 28, and selection transistor 33 to ground level.

In accordance with a primary aspect of the present invention, the threshold circuit 13 is connected to data node 12 to provide a faster discharge of the voltage level at node 12 and corresponding faster delivery of an output voltage signal to the output circuitry 14. For these purposes, the threshold circuit includes a shunt field effect transistor 36 having its source-drain conduction path connected in series between data node 12 and terminal 37. The $\phi_{1+2}$ clock signal is connected to terminal 37 to provide a source of reference voltage thereat. During the evaluation interval, the $\phi_{1+2}$ clock signal is at ground level and the shunt transistor, if conductive, provides a secondary discharge path between node 12 and ground.

The threshold circuit 13 further comprises an inverter arrangement including inverter field effect transistor 38 and load field effect transistor 39, the source-drain paths of these two transistors connected in electrical series between ground level and $V_{DD}$. The control electrode of inverter field effect transistor 38 is connected to the data node 12, while the control electrode of the load field effect transistor is connected to receive the $\phi_{3+4}$ clock signal. The common point between transistors 38 and 39 provides output node 40 of the threshold circuit and is connected to direct an output signal to the output circuitry 14. In addition, the output node 40 is connected in feedback relation to the control electrode of the shunt field effect transistor 36.

A precharge field effect transistor 41 has its source-drain path connected between data node 12 and terminal 42. The $\phi_{1+2}$ clock signal is connected to terminal 42 and to the control electrode of precharge transistor 41. The precharge transistor is conductive during the precharge interval to precharge the node 12 to a true logic level.

The threshold circuit 13 operates as follows. During the precharge interval (i.e., during $\phi_{1+2}$), the true level of the $\phi_{1+2}$ clock signal at terminal 42 is applied to data node 12 through precharge transistor 41 to precharge the data node to a first voltage level corresponding to the true clock signal level. It will also be recalled that the columns 15–20 of the read-only memory are precharged during the precharge interval to a true voltage level. When the precharging voltage level at the data node 12 reaches the threshold voltage level of inverter field effect transistor 38 connected to the data node, the transistor 38 is rendered conductive to connect the output node 40 to ground level. Grounding of the output node, in turn, applies ground level to the control electrode of shunt field effect transistor 36 thereby turning off the shunt transistor. In addition, during the precharge interval, the $\phi_{3+4}$ clock applied to the control electrode of load field effect transistor 39 is at ground level, so that transistor 39 is rendered nonconductive. Thus, during the precharge interval, data node 12 is established at a true level and output node 40 is established at a false level. In the voltage waveforms of FIG. 2, the true level of node 12 is illustrated at 43, and the false level of node 40 is illustrated at 44.

If during a preceding operating cycle, the voltage level at output node 40 had been true, then at the beginning of the succeeding precharge interval this true level on node 40 would render shunt field effect transistor 36 conductive. Since, as noted in the preceding paragraph, shunt transistor 36 is not turned off until the precharge of data node 12 has been partially completed, during the early stages of precharge, the $\phi_{1+2}$ signal at terminal 37 is connected through transistor 36 to contribute to the precharge operation until transistor 36 is turned off. It will be apparent that had a fixed ground level been provided at terminal 37, in lieu of the clock signal $\phi_{1+2}$, then during the early stages of precharge the data node 12 would be connected through the conductive shunt transistor 36 to ground thereby preventing precharge of the data node. During the precharge interval, the $\phi_{1+2}$ clock signal at terminal 37 prevents this premature shunting of the precharge voltage and, in fact, contributes to the actual precharge of the data node. During the following evaluation interval, the $\phi_{1+2}$ clock signal provides the desired ground level at terminal 37.

During the evaluation interval (i.e., during $\phi_{3+4}$), the voltage level at data node 12 will either remain at its true level or will be discharged through the read-only memory 11 to a false level, depending upon the logic state of data stored at the desired memory address location. Considering first the case in which a conductive discharge path is provided through the memory to discharge data node 12 from true to false (i.e. from the negative precharge level to ground), reference is again made to the waveforms of FIG. 2 representing the voltages at node 12 and at node 40.

At the beginning of the evaluation interval, data node 12 begins to discharge as illustrated by numeral 45 in FIG. 2. At the same time, clock signal $\phi_{3+4}$ renders load field effect transistor 39 conductive to cause the output voltage at node 40 to jump slightly negative with respect to its initial ground level as illustrated by numeral 46 in FIG. 2. The exact level of the output voltage throughout $\phi_{3+4}$ will depend on the conductance ratio of transistor 38 to transistor 39, which in the preferred embodiment is approximately nine to one.

As the discharging voltage on node 12 approaches the threshold value for inverter transistor 38, this transistor begins to turn off slightly, so that transistors 38 and 39 of the inverter form a ratioed circuit which causes output node 40 to be driven more negative as shown at 47 in FIG. 2. Significantly, when the output node reaches the threshold value of shunt field effect transistor 36, the shunt transistor is turned on to immediately connect the data node 12 to the ground level provided at terminal 37 by the $\phi_{1+2}$ clock signal during the evaluation interval. Thus, it will be apparent that node 12 is connected to ground along a secondary path through shunt transistor 36 as well as along the primary path through the read-only memory 11. Driving the data node to ground through the secondary shunt path in this fashion serves to turn inverter field effect transistor 38 off hard which, in turn, enables output node 40 to be driven hard to a more negative or true level through load transistor 39. The result is regenerative feedback action which provides a more rapid discharge to ground of the data node voltage, as illustrated at 48, in FIG. 2, and a corresponding sharp transition of the output node voltage to a strong negative level, as illustrated at 49 in the Figure. The voltages at both nodes reach their desired levels well before the end of the evaluation interval. As a result, the output circuitry, which responds to the logic level at node 40 at the end of the evaluation interval, receives a strong output true level indicated at 50 in FIG. 2, which precludes an incorrect interpretation of the output level by the circuitry 14.

For contrast, the waveforms for nodes 12 and 40 are extended in dashed outline, at 51 and 52, respectively, in FIG. 2 to illustrate the increased discharge time without the threshold circuit of the present invention, in which case the proper voltage levels are not attained by the end of the evaluation interval.

Turning now to the case in which data node 12 does not discharge through the read-only memory, the data node will remain at its precharged true voltage level. As a result, inverter field effect transistor 38 will remain conductive to hold output node 40 close to ground in spite of the application of clock signal $\phi_{3+4}$, and shunt field effect transistor 36 will be held off by the ground level supplied to its control electrode. Accordingly, the ground or false level maintained at the output node will be directed to the output circuitry 14.

From the foregoing, it will be evident that the present invention satisfies the need for a circuit which provides faster switching of a node voltage signal between first and second logic levels. This is accomplished by providing a shunt path from the node to the second logic level and completing the shunt path in response to transition of the node voltage toward the second level. In conjunction with a read-only memory, the threshold circuit enables stored information to be read out of the memory at a faster rate providing for higher frequency operation of the memory or for provision of a larger capacity memory at a given operating frequency. It will also be apparent that the threshold circuit has application in other memory and logic circuits where the need to decrease the switching time of a logic signal exists. Moreover, it will be apparent that while a preferred embodiment of the invention has been shown and described, various modifications and changes may be made without departing from the spirit and scope of the invention.

I claim:

1. In a semiconductor memory system including a memory having address locations for storage of binary information thereat, and means for retrieving information from a desired address location for readout at a data node by precharging said data node to a first voltage level during a precharge interval and discharging said data node to a second voltage level along a primary discharge path through said memory during an evaluation interval as a function of the binary state of information stored at said desired address location, the improvement comprising:

shunt means providing a controlled, secondary discharge path for speeding the discharge of said data node, said shunt means including a shunt field effect transistor having the source-drain path thereof connected between said data node and a voltage source and having a control electrode connected to receive a control voltage in response to the discharging of said data node, said control voltage serving to turn on said shunt field effect transistor to complete said secondary discharge path and thereby decrease the time required to discharge said data node; and wherein said voltage source connected to said shunt field effect transistor is a clock voltage source which assumes said first voltage level during said precharge interval and assumes said second voltage level during said evaluation interval, whereby said voltage source, if said shunt field effect transistor is conductive during said precharge interval, prevents premature discharge of said data node while contributing to the actual precharge thereof.

2. The memory system of claim 1 including:

an output node;

an inverter circuit connected between said data node and said output node, and means connecting said output node in feedback relation to the control electrode of said shunt field effect transistor.

* * * * *

UNITED STATES PATENT OFFICE

CERTIFICATE OF CORRECTION

Patent No. 3,848,236 Dated November 12, 1974

Inventor(s) Bruce L. Troutman

It is certified that error appears in the above-identified patent and that said Letters Patent are hereby corrected as shown below:

Column 2, line 18, after "second" add -- logic --.

Signed and Sealed this

*twenty-second* Day of *July 1975*

[SEAL]

*Attest:*

RUTH C. MASON
*Attesting Officer*

C. MARSHALL DANN
*Commissioner of Patents and Trademarks*